Patented Mar. 7, 1939

2,150,068

UNITED STATES PATENT OFFICE 2,150,068

PROCESS FOR THE OBTAINMENT OF ARTIFICIAL RUBBER

Ernst Kleiber, Lugano, via Trevano, Switzerland, assignor to Hevapar S. A., Geneva, Switzerland, a corporation of Switzerland No Drawing. Application July 6, 1936, Serial No. 89,247. In France April 11, 1936

8 Claims. (Cl. 106—23)

The object of the present invention is to produce a plastic, elastic, vulcanizable matter having the same chemical and physical properties as natural plantation rubber, from carbohydrates such for instance as sugars, their derivatives or their wastes, and especially, beet sugar, cane sugar, or sugar from other vegetable origin, the juices obtained in the course of the manufacture of said sugars, the wastes or residues from refinery.

Carbohydrates are alkyl bodies the structural formula of which is complicated, but the composition formula of which is simple. Whatever be the number of atoms of carbon in the formula, hydrogen and oxygen are always combined therein in the same proportion, corresponding to $H_2O$, whence their name of carbohydrate.

Mono-saccharides, di-saccharides, poly-saccharides, either hydrolyzable or not, all have in common the property of being polymers of methanal HCHO, always including in their molecule several aldehyde and alcohol functions; some are aldoses, other are ketoses. In the presence of hydrochloric acid and nitric acid, there is formed an aldoketose or a mixture of aldose and ketose. This mixture may subsequently be oxidized by means of a terpene, for instance oil of turpentine.

Therefore the method according to the present invention includes, in succession, a depolymerization of sugars and an oxidation which produces a phenomenon of absorption of the sugars by terpenes, the latter having a very high molecular weight. This saccharose-terpene product itself undergoes a long polymerization which transforms it into a mass capable of being vulcanized. However, care should be taken of pouring the terpene compound only after full absorption of the sugars by the acids, as indicated by the following example:

Example

I take 5000 grammes of beet sugar, which is stirred in the cold state together with a mixture consisting of 400 grammes of hydrochloric acid and 150 grammes of ordinary nitric acid.

The stirring is effected for about eighteen hours. Then, still in the cold state, I add gradually 200 grammes of an oil of turpentine the distillation point of which is between 165 and 178° C., and I keep stirring the mass until it is fully thickened.

I then neutralize by means of a base, for instance caustic soda in the form of flakes. By washing with cold water, I remove the sodium chlorides and nitrates which may have been formed. The last mentioned product, which has a certain commercial value, may be recuperated.

In a drying apparatus, the mass is caused to dry until water is wholly evaporated.

The vessel that is employed is an autoclave or any other closed receiver fitted with blade stirring means.

The yield calculated from the raw material (sugar and oil of turpentine) ranges from 78 to 83% and the product that is obtained is a plastic, elastic and vulcanizable matter, having all the physical and chemical properties of natural plantation rubber, and adapted to all its applications, from dissolution and use as an elastic matter to the hardest vulcanization treatment.

While I have, in the above description, disclosed what I deem to be a practical application of the present invention, it should be well understood that I do not wish to be limited thereto as there might be changes made in the specific details of the process without departing from the principle of the present invention as comprehended within the scope of the appended claims.

In the appended claims the expressions "sugar derivatives" and "wastes from the manufacture of sugar" refer to materials containing sugar in a chemically available form.

What I claim is:

1. A method of obtaining a product having the appearance and the physical and chemical properties of natural plantation rubber which comprises treating with hydrochloric and nitric acids a carbohydrate of the group consisting of the sugars, sugar derivatives, and wastes from the manufacture of sugar, thickening the product thus obtained by means of turpentine, neutralizing by means of a base, and drying.

2. A method of obtaining a product having the appearance and the physical and chemical properties of natural plantation rubber which comprises treating a sugar hydrochloric acid and nitric acid, thickening the product thus obtained with turpentine, neutralizing by means of a base, and drying.

3. A method according to claim 1 in which said carbohydrate is a derivative of sugar.

4. A method according to claim 1 in which said carbohydrate consists of wastes of the manufacture of sugar.

5. A method of obtaining a product having the appearance and the physical and chemical properties of natural plantation rubber which comprises treating a sugar with hydrochloric and nitric acids, thickening the product thus obtained with a turpentine oil, neutralizing by means of a base, and drying.

6. As a new product, the reaction product of a carbohydrate of the group consisting of the sugars, sugar derivatives, and wastes from the manufacture of sugar, and hydrochloric and nitric acids, thickened by means of turpentine, neutralized and dried, this product having the appearance and physical and chemical properties of natural rubber.

7. A method of obtaining a product having the appearance and the physical and chemical properties of natural plantation rubber which comprises treating sugar with a mixture of hydrochloric and nitric acids, in the approximate proportion of 1 part acid to 10 parts sugar, thickening the mass by the addition of oil of turpentine, neutralizing the mass and drying.

8. A method according to claim 7, in which the materials are employed in the approximate proportions of 5000 parts of sugar, 400 parts hydrochloric acid, 150 parts nitric acid, and 200 parts oil of turpentine.

ERNST KLEIBER.